Nov. 25, 1947. R. KELLER ET AL 2,431,486
METHOD OF STARTING SYNCHRONOUS MACHINES
Filed Feb. 6, 1945

Patented Nov. 25, 1947

2,431,486

UNITED STATES PATENT OFFICE 2,431,486

METHOD OF STARTING SYNCHRONOUS MACHINES

Robert Keller, Ennetbaden, and Eugen Handschin, Baden, Switzerland, assignors to Aktiengesellschaft Brown, Boveri & Cie., Baden, Switzerland, a joint-stock company Application February 6, 1945, Serial No. 576,496
In Switzerland October 19, 1943

3 Claims. (Cl. 318—171)

It is known that synchronous machines, especially synchronous motors, can be started by bringing a separate asynchronous motor with slip-ring rotor first of all up to full speed and then connecting it on the secondary side to the terminals of the excited synchronous machine which is to be started, whereupon it is gradually slowed down to a standstill. The secondary part of the asynchronous machine thus supplies the machine which is to be started with a frequency and a voltage proportional to it, these gradually increasing from zero up to the network frequency and to the machine voltage proportional to this frequency respectively. Since the asynchronous motor which runs light first of all has substantially zero frequency and voltage, the synchronous motor does not take any current and therefore develops no torque. Only after the asynchronous motor has been slightly braked does the voltage rise; since, however, the frequency also rises, the synchronous motor can no longer get into synchronism, particularly if it has to overcome a certain counter-torque. The conditions become increasingly unfavourable the greater the ohmic resistance of the synchronous motor becomes when compared with its inductive resistances. At zero frequency the inductive resistance is, however, also zero and the finite ohmic resistance of the synchronous machine is then always infinitely greater than the inductive resistance. The synchronous motor thus cannot start with the frequency with which it is supplied and at the voltage proportional to this frequency. Artificial measures thus have to be adopted which enable the synchronous motor to acquire the necessary starting torque. This is especially necessary as regards synchronous motors which have to start under a load or have no pressure oil lubrication.

According to the present invention a special additional current source is added to the set which supplies the synchronous machine with the necessary starting torque and for this purpose is only in operation during starting.

Figure 1:
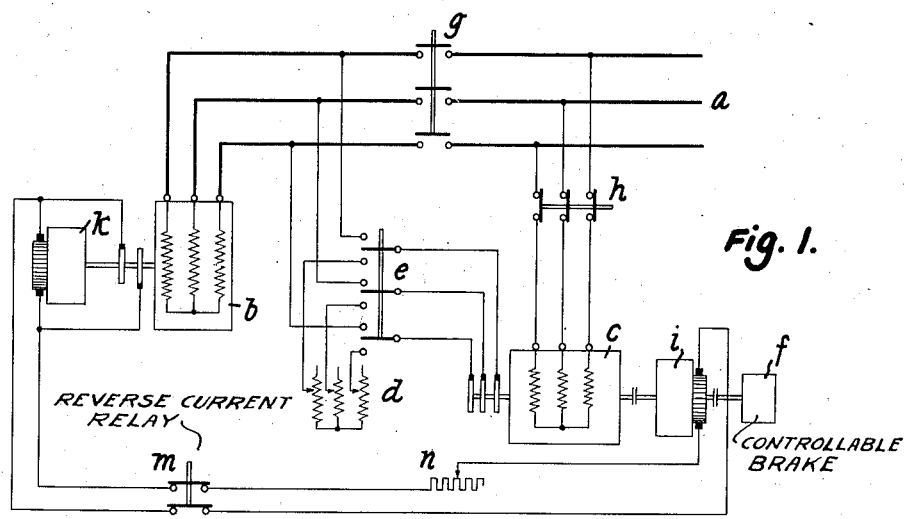
Figure 2:
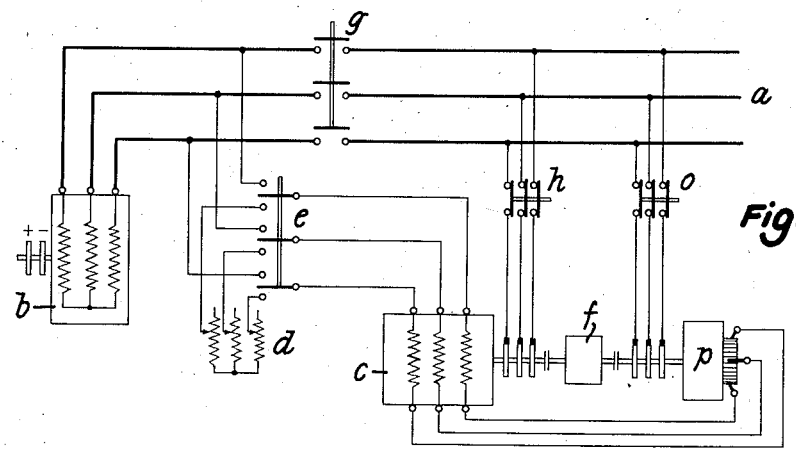

Two constructional examples of the invention are illustrated diagrammatically in the accompanying drawing, both Figures 1 and 2 showing a synchronous motor $b$ which has to be started and to be connected to a network $a$. For this purpose asynchronous motor $c$ is started by means of starting resistance $d$ to which it is connected by means of change-over switch $e$. When this motor has reached full speed, switch $e$ is put over (upper position) so that the stator winding of the synchronous motor $b$ which is to be started and which is excited with direct current from the machine $k$ to which it is coupled, is connected to the rotor slip rings of the asynchronous motor $c$, and motor $c$ is then slowly retarded by applying brake $f$ with which it is coupled. Frequency and voltage at the terminals of synchronous motor $b$ thus increase proportionally with the slip of motor $c$ until finally when at a standstill this latter acts like a stationary transformer and transmits the network frequency and voltage to machine $b$. This latter commences to run as soon as its torque overcomes the standstill torque and finally, that is when motor $c$ stands still, runs with network frequency. If the rotor of motor $c$ when at a standstill is now brought into phase coincidence with its stator, then the phase position of machine $b$ coincides with that of network $a$, so that the circuit breakers $g$ can be closed. The change-over switch $e$ can then be moved into its mid-position and motor $c$ disconnected from the network by opening switch $h$.

Asynchronous motor $c$ thus operates during the starting period of the synchronous machine $b$ simultaneously as a frequency and voltage transformer and only during standstill as a pure voltage transformer. Synchronous machine $b$, whose pole wheel is excited, is started with practically constant field, on condition that the ohmic resistance of the synchronous machine winding is negligibly small when compared with its inductive resistance. This does not apply, however, to the small starting frequencies commencing at zero, because in this case the ohmic resistance predominates, so that the field and therefore also the torque of the stationary machine is equal to zero or very small. In order to start machines having a high starting torque, particularly machines without pressure oil lubrication, or in such cases where the machine has to start under load, in accordance with the invention special means have to be employed to overcome the stationary friction or the load torque.

With the arrangement shown in Fig. 1 the special means consist in the provision of the direct current machine $i$ which is coupled to the asynchronous motor $c$. After motor $c$ has been started, the machine $i$ supplies the necessary excitation for the motor $b$ which has to be started when this latter together with the built-on exciter $k$ are at a standstill; machine $i$ also supplies exciter $k$ so that it operates as a motor and transmits mechanically a starting torque to the synchronous motor $b$. As the starting process continues the voltage of machine $i$ decreases whilst that of machine $k$ increases. In order to prevent machine $i$ from running as a motor and thus opposing the braking effect on the asynchronous motor c, switch m is opened when the voltages of machines i and k are equal. Furthermore a regulating resistance n is provided in the line which connects the two machines. As long as machine i operates as a generator, it has a braking effect, so that there is a saving in mechanical braking power and brake f has less work to do. If the machine which is to be started is a single-phase synchronous machine, then it is possible to determine the direction of rotation by means of the direct current machine k.

Another means of overcoming the stationary friction or load torque of a machine is illustrated in Fig. 2. In this case a voltage which is independent of the frequency is introduced into the circuit of the main machine b, so the latter already has an armature field at zero frequency which ensures the development of an adequate torque. For this purpose a frequency converter p with commutator is connected to the secondary part of the asynchronous motor c; the primary side of this converter is connected to the network and already supplies a voltage when the frequency on the secondary side is zero. This machine does not require to be large because it must only cover the ohmic voltage drop of machine b. The frequency converter p can, as shown in the figure, lie in series with the secondary winding of motor c. When the starting torque of machine b has been overcome, the frequency converter can be disconnected from the network by switch o.

Since machines i and k are only in operation for short periods they can be made small and cheap.

We claim:

1. Apparatus for starting an alternating current synchronous machine having relatively rotatable alternating current armature and direct current field windings and a built-on exciter for said field winding, said starting means comprising, an alternating current asynchronous motor having relatively rotatable primary and secondary members, connections between said primary member and a source of alternating current, connections between said secondary member and the alternating current winding of said synchronous machine, means for braking the rotatable member of said asynchronous motor to thereby gradually increase the frequency of the alternating current supplied by the secondary of said asynchronous motor to the alternating current winding of said machine, a direct current generator driven by said asynchronous motor, and connections between the armatures of said exciter and generator whereby during starting of said synchronous machine, said generator will supply power to said exciter for temporary operation thereof as a motor and increase the starting torque of said machine.

2. A starting apparatus as defined in claim 1 wherein the connections between the secondary of said asynchronous motor and the alternating current winding of said asynchronous machine include a change-over switch for initially connecting the asynchronous motor secondary to a starting resistance.

3. A starting apparatus as defined in claim 1 and further including an adjustable resistance and switch in the connections between the armatures of said exciter and generator.

ROBERT KELLER.
EUGEN HANDSCHIN.

REFERENCES CITED

The following references are of record in the file of this patent:

UNITED STATES PATENTS

| Number | Name | Date |
|--------|------|------|
| 755,824 | Woodbridge | Mar. 29, 1904 |